(12) United States Patent
Sander

(10) Patent No.: US 7,489,442 B2
(45) Date of Patent: Feb. 10, 2009

(54) STEREOSCOPIC MICROSCOPE

(75) Inventor: Ulrich Sander, Rebstein (CH)

(73) Assignee: Leica Microsystems (Schweiz) AG, Heerbrugg (CH)

(*) Notice: Subject to any disclaimer, the term of this patent is extended or adjusted under 35 U.S.C. 154(b) by 0 days.

(21) Appl. No.: 12/022,484

(22) Filed: Jan. 30, 2008

(65) Prior Publication Data

US 2008/0117501 A1 May 22, 2008

Related U.S. Application Data

(63) Continuation of application No. 10/891,691, filed on Jul. 15, 2004, now abandoned.

(30) Foreign Application Priority Data

Jul. 17, 2003 (DE) .................. 103 32 603

(51) Int. Cl.
*G02B 21/22* (2006.01)
(52) U.S. Cl. ................ 359/377; 359/374; 359/376
(58) Field of Classification Search ........... 359/377, 359/374, 376
See application file for complete search history.

(56) References Cited

U.S. PATENT DOCUMENTS

| 4,623,223 | A | 11/1986 | Kempf |
| 4,856,872 | A | 8/1989 | Spitznas et al. |
| 5,282,085 | A | 1/1994 | Volkert et al. |
| 5,321,447 | A | 6/1994 | Sander et al. |
| 6,304,374 | B1 | 10/2001 | Hanzawa |
| 6,598,972 | B2 | 7/2003 | Strahle |
| 2001/0010592 | A1 | 8/2001 | Nakamura |
| 2002/0118448 | A1 | 8/2002 | Kirchhuebel et al. |
| 2003/0165012 | A1 | 9/2003 | Straehle et al. |

FOREIGN PATENT DOCUMENTS

GB 2295027 A 5/1996

OTHER PUBLICATIONS

Oculus Optikgerate GmbH, product brochure: SDI II BIOM II, Sep. 1998.

*Primary Examiner*—Joshua L Pritchett
(74) *Attorney, Agent, or Firm*—Hodgson Russ LLP

(57) ABSTRACT

Stereoscopic microscope comprising an optical inverter system (21*a*, 21*b*) for erecting a pseudo-stereoscopic image and reversing the viewing beams thereof, wherein the inverter system comprises at least one deflector element (21*a*, 21*b*) having a focal power.

10 Claims, 2 Drawing Sheets

STEREOSCOPIC MICROSCOPE

CROSS-REFERENCE TO RELATED APPLICATIONS

The present application is a continuation of U.S. patent application Ser. No. 10/891,691 filed Jul. 15, 2004, now abandoned, which claims priority of German patent application number 103 32 603.0 filed Jul. 17, 2003.

FIELD OF THE INVENTION

The present invention relates to a stereoscopic microscope of a type having an optical inverter system for erecting a pseudo-stereoscopic image and reversing of the viewing beams thereof.

BACKGROUND OF THE INVENTION

Opthalmological microscopes as such are known. They comprise a main objective, a magnification system disposed thereafter, i.e. behind the main objective, and a binocular system with oculars (eyepieces). In order to provide a stereoscopic microscope in a magnification system, which is, for example, designed as a zoom system, the main beam path, which passes the main objective lens may be split into a number of beam paths. Further, opthalmological microscopes are known, which allow for a simultaneous inspection of the object by a first user (main surgeon) and a second user (assistant).

Intraocular surgery requires supplementary optical systems, for example in order to microscopically inspect the fundus or parts of the vitreous body of a human eye, which are close to the fundus. These consist of lenses, which are disposed in front of the main objective at the side of the object.

A supplementary optical system of this kind is described in the brochure "SDI II, BIOM II" of Oculus Optikgeräte GmbH published in 1998, as well as in U.S. Pat. No. 4,856,872. This supplementary optical system comprises a lens (opthalmoscopical lens) to be positioned close to the object to be inspected, and a lens (reduction lens), which is positioned closer to the main objective.

From DE 41 14 646 C2 a solution is known, according to which an ophtalmological attachment for a surgical microscope is accommodated in an attachment housing, which is laterally positionable with respect to the main objective. The attachment comprises an ophtalmoscopical lens, an optical image erecting system and a slideable lens (correcting lens) for focussing.

The image erecting system is needed, because the supplementary optical systems reverse the microscopic image with respect to its height extension and its lateral extension, thereby giving a pseudo-stereoscopic virtual image. This means among other things that the front and the back of depth perception of the intermediate image created by the ophtalmoscopical lens are reversed. However, in order to allow for microsurgical operations, an erected, stereoscopically correct image is required. For this reason, in order to avoid the otherwise resulting pseudo-stereoscopic effect in viewing, a reversal (an exchange) of the two viewing beam paths (reversal of pupils) must occur simultaneously to the required erection of the image. An especially preferred embodiment of such an optical system for erecting images is known as SDI-System (stereoscopic diagonal inverter). A system of this kind is known, for example, from the already mentioned brochure "SDI II, BIOM II" dating from 1998. However, the use of such SDI systems is accompanied by considerable disadvantages for the microscope system or the image quality of the microscope. In particular, adapting the optical beam path of these supplementary systems to that of the stereo microscope has proved to be very cumbersome. Frequently, this results in poor image quality and field clipping, which is caused by insufficient mechanical adaptation of the SDI-system to the microscope. Further, the overall height of such SDI-systems influences the ergonomic overall height of the microscope in a negative way.

SUMMARY OF THE INVENTION

For a stereoscopic microscope, the present invention aims to invert laterally inverted, pseudo-stereoscopic image in a simple way, i.e. to image in a laterally correct and stereoscopically correct manner.

This aim is achieved by means of a stereoscopic microscope comprising an optical inverter system for erecting a pseudo-stereoscopic image and reversing the viewing beam paths of the pseudo-stereoscopic image, wherein the inverter system includes a deflector element having a focal power.

With the inventive measure of providing an optical inverter system for erecting a pseudo-stereoscopic image and reversing the viewing beams thereof, comprising at least one deflector element provided with a focal power it is possible in a simple way to reduce the overall height of the stereoscopic microscope as compared to conventional solutions. Hence, it is possible in an advantageous manner to reduce the ergonomic overall height of the microscope as well.

It is advisable that a stereoscopic microscope comprises two deflector elements provided with a focal power. Thereby, it is possible, for example, to deflect a beam path, especially a horizontally proceeding one, which is incident upon the first deflector element, initially into a vertical (perpendicular) direction, and subsequently, by means of a further deflection by the second deflecting element to create a beam path, which proceeds substantially parallel to the original horizontal beam path. Thereby, a laterally and vertically correct image is created along the beam path, which proceeds vertically between the two microscope planes. Therefore, this vertically proceeding beam path may be used in an optimal manner. Thereby, the overall size of a stereoscopic microscope may be kept very small, and an available construction space may be exploited in an optimal manner.

According to an especially preferred embodiment of the stereoscopic microscope according to the invention, at least one deflector element of the inverter system is designed as a concave mirror. Concave mirrors may be provided in a simple and cost-effective way, and may further be adjusted easily. It is further imaginable to employ deflector prisms designed to have a focal power as deflector elements.

It is advisable that the stereoscopic microscope according to the invention comprises a main objective, which defines a first optical axis, and deflector elements to deflect a beam path proceeding parallel to the first optical axis along a second optical axis in a first plane of the microscope, which extends at an angle, in particular substantially perpendicularly to the first optical axis, and subsequently to be directed along a third optical axis in a second plane of the microscope, which extends substantially parallel to and above the first plane of the microscope. A stereoscopic microscope constructed in this way has a small overall height, as compared to conventional solutions, because a major part of the necessary or appropriate optical components, may be provided in the first and second planes of the microscope, which preferably extend horizontally.

According to a further preferred embodiment of the stereoscopic microscope according to the invention, it comprises a magnification system, especially a zoom system, which is provided in the first or second plane of the microscope, along the second or third optical axis, respectively, and comprises at least two stereoscopic viewing channels. Such a zoom system may be positioned selectively in front of or behind the inverter system. In particular, it proves to be especially beneficial to position it behind the inverter system, because in this case the requirements for the deflector elements of the inverter system with respect to precision are comparatively low. It may also be considered to provide the magnification system between the two planes of the microscope along the vertically proceeding beam path. In that the magnification system is positioned accordingly, the overall height and/or the horizontal overall length of the microscope, may be influenced in the desired way.

It proves to be especially advantageous that at least one of the inverter system's deflector elements with a focal power additionally serves as deflector element for deflecting beam paths between the first, second and third optical axes. By means of such a multiple functionality of the deflector elements, construction space may be kept small in an effective way.

The stereoscopic microscope according to the invention preferably has an decoupling means to decouple an assistant beam path from a main investigator beam path. By means of such an decoupling means, which may, for example, be provided as a physical or a geometrical beam splitter, an inspection by the main investigator and an inspection by the assistant may be provided in a simple way.

BRIEF DESCRIPTION OF THE DRAWINGS

The invention is now described with reference to the accompanying drawings. Therein.

DETAILED DESCRIPTION OF THE INVENTION

Figure 1:
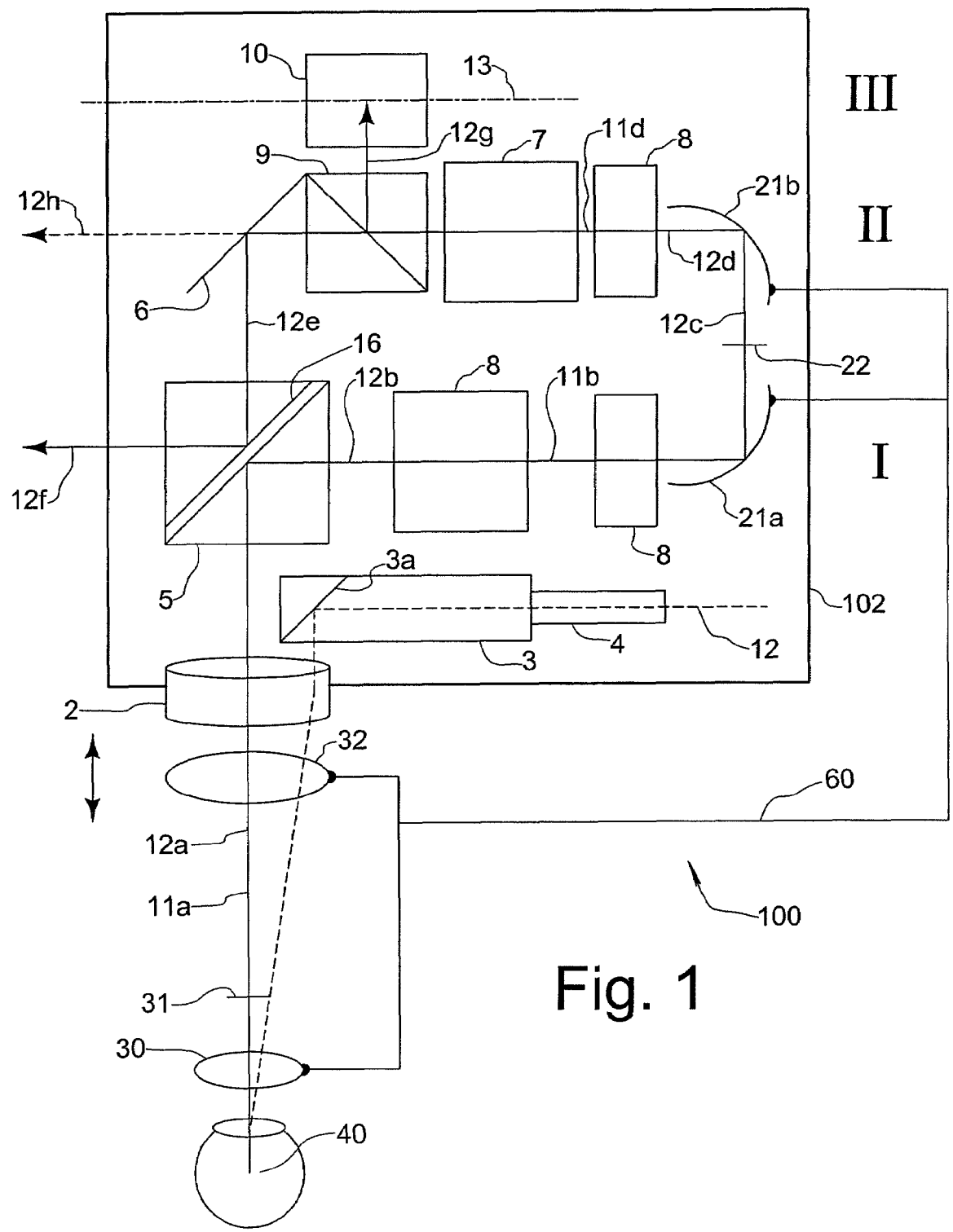
FIG. 1 shows a lateral schematic sectional view of a preferred embodiment of a stereoscopic microscope according to the invention, having an opthalmological attachment provided therebefore.

In FIG. 1, a preferred embodiment of the stereoscopic microscope according to the invention as a whole is designated by reference numeral 100. The stereoscopic microscope comprises a microscope body 102, in which a main objective 2 and a magnification system 7, which is especially designed as a zoom system, are provided as optical components.

The microscope further comprises deflector elements 5, 21a, 21b. By means of these deflector elements, viewing beams 12a to 12h, which emerge from an object 40 to be inspected, and which at first pass the main objective 2 substantially (at 21a) in vertical direction along the optical axis thereof, which is referred to as first optical axis 11a in the following, are deflectable into two substantially horizontally extending planes I and II of the microscope (at 12b, 12d). It can be seen that the magnifying system 7, in the embodiment shown is disposed in the second plane II of the microscope. The optical axes in the first and second planes of the microscope are subsequently referred to as second and third optical axes 11b, 11d, respectively.

At the object side of the magnifying system 7 supplementary optical components are provided, selectively in the first and/or second plane I, II of the microscope, along the respective optical axes, which as a whole are referred to by reference numeral 8 herein, which comprise for example filters, laser shutters, optical dividers or elements for creating intermediate images.

The microscope shown is designed for simultaneous inspection of the object 40 by a main surgeon and by an assistant. To achieve this aim, a deflecting element or a decoupling means 9 is provided in the second plane II of the microscope, effecting the decoupling of the viewing beam path 12g for the assistant with respect to the viewing beam path 12d for the main surgeon. The inspection of the object 40 by the assistant takes place in a third plane III of the microscope.

The stereoscopic splitting of the (uniform) beam path 12a, which is incident upon the main objective 2, may occur at an arbitrary position within the microscope housing 102 in a manner, which as such is known. It is advisable that the stereoscopic splitting is carried out by means of the magnifying system 7, which may comprise, for example, two or four stereoscopic viewing channels. It may also be considered to provide the magnifying system 7 with four stereoscopic viewing channels grouped in pairs, wherein one pair of stereoscopic viewing channels is provided for the main surgeon and the other pair for the assistant.

Figure 2:
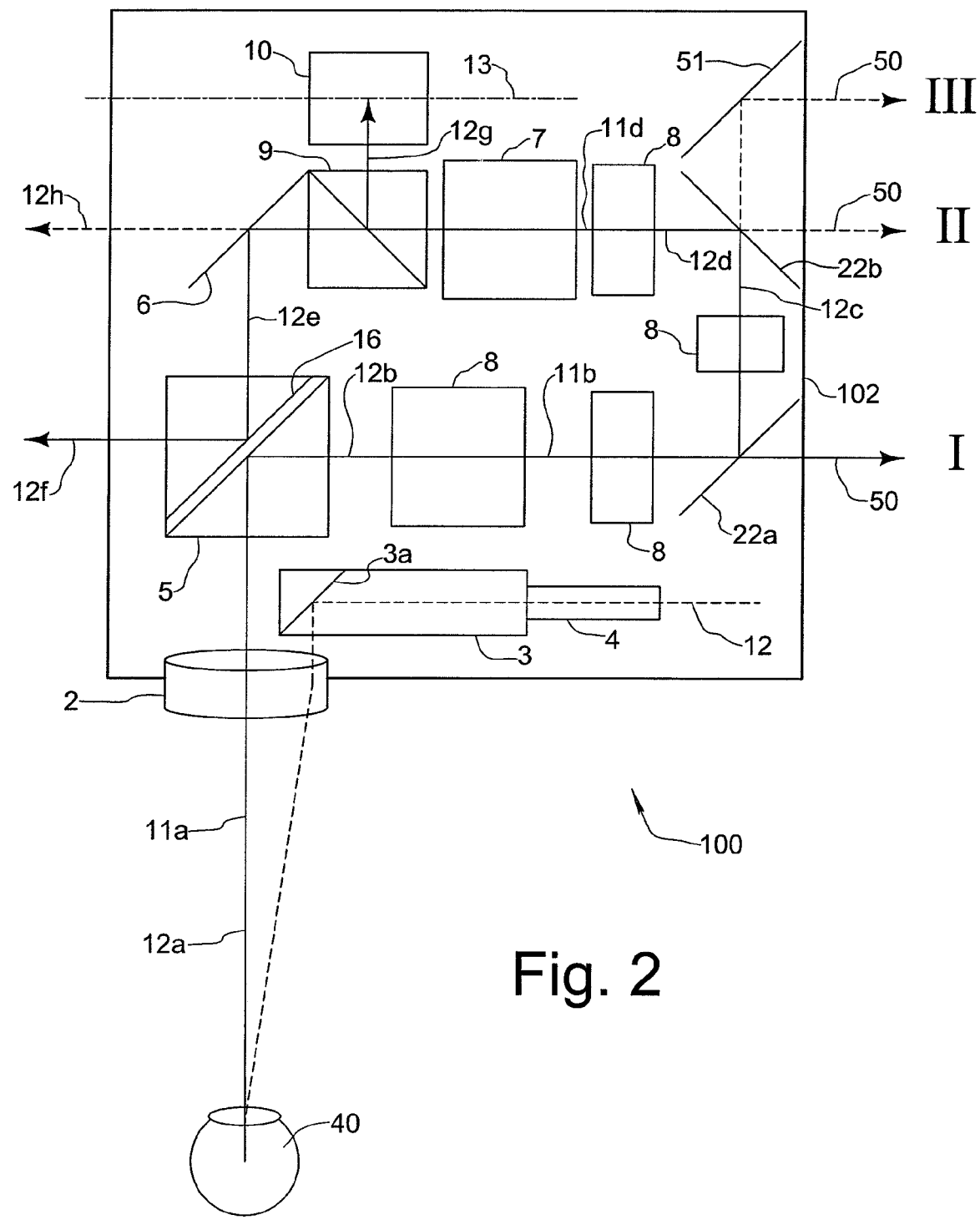
FIG. 2 shows the microscope according to FIG. 1 without opthalmological attachment and accordingly adapted optical system.

The provision of four magnifying channels within the context of the magnification system enables the implementation of a small vertical distance between the respective viewing axis and the object to be inspected both for the main surgeon as well as for the assistant. It is advisable that two magnifying channels for the magnifying system, in particular the magnifying channels for the main surgeon, proceed horizontally at the same height, whereas two further magnifying channels proceed parallel herewith, i.e. also horizontally, with a vertical spacing. These magnifying channels with vertical spacing are especially useable for the assistant. In this respect, it is especially possible that the magnifying channels provided with vertical spacing proceed above or below, respectively, the center of the connecting line between the magnifying channels for the main surgeon provided at the same height. Thereby, an especially dense packaging of the four magnifying channels is provided, whereby an especially small overall height of the stereoscopic microscope according to the invention may be achieved. For reasons of clarity, in FIGS. 1 and 2, only single viewing beam paths are shown. In particular, in the second plane II of the microscope, the viewing beam path is referred to by 12d. As an explanation, it shall be noted that the two viewing beam paths for the main surgeon are arranged behind each other in the viewing direction of FIGS. 1 and 2, so that only one of these viewing beam paths can be shown. The viewing beam paths in the second plane of the microscope, which have a vertical spacing, and which, by the deflector element 9, are deflected into the third plane III of the microscope, are not shown in detail. Further, with respect to the preferred embodiment of the magnification system 7, the vertically proceeding viewing beam path 12g is only a schematic simplification, since actually in this embodiment, as shown in FIGS. 1 and 2, a total of two viewing beam paths which proceed vertically parallel to each other, are deflected to the third plane of the microscope. A complete illustration of this preferred embodiment of a magnification system is disclosed in DE 102 55 960, to which reference is made herewith.

By means of binocular tubes (not shown), the decoupling means 9 allow for a stereoscopic inspection of the object 40 by the main surgeon and/or the assistant.

It is advisable, that in order to obtain a further deflection of the stereoscopic viewing beam paths for the main surgeon, a further deflection element 6 is provided behind the decoupling means 9, by means of which the (stereoscopic) viewing beam paths (at 12e) for the main surgeon can be deflected from the second plane II back to, for example, the first plane I of the microscope. In the first plane I, a further deflection element 16 is provided, by means of which the viewing beam paths for the main surgeon are deflected into a substantially horizontal direction again. The beam paths proceeding to a binocular tube (not shown) in plane I of the microscope are referred to by 12f.

If, however, an inspection of object 40 by the main surgeon is desired in the second plane II of the microscope, the deflector element 6 may be omitted, or it may be provided in a semi-transparent or relocatable manner. In this case, the viewing beam paths for the main surgeon referred to by 12h result.

For the assistant, a further deflector element 10 is provided in the third plane III of the microscope, by means of which the beam paths 12g, which are decoupled by decoupling means 9 (and are substantially vertically proceeding), are deflectable to the third plane of the microscope (i.e. substantially in a horizontal direction). It is advisable that depending on the orientation of the assistant beam paths, the deflector element 10 may be pivoted about an axis 13 or an axis, which proceeds perpendicular to this axis, so that by means of the binocular tube for the assistant (not shown), an assistant's viewing is possible, in the example shown into the drawing plane or out of the drawing plane.

An illumination system of the microscope shown is as a whole referred to by 3,4, wherein a fiber cable for illumination means 3 is referred to by 4. By means of a deflector element 3a, light from the fiber cable is incident, at a desired angle, upon the object 40 to be illuminated. The optical axis of fiber cable 4 is designated by 12.

The microscope 100 is further provided with a supplementary optical system 30, 32, which allows the carrying out of intraocular surgery.

The supplementary optical system comprises an opthalmoscopical lens or fundus lens 30, and a correcting lens 32. The opthalmoscopical lens 30 serves to optically compensate the focal power of the eye.

Since the opthalmoscopical lens 30 and the correcting lens 32 are jointy used in intraocular surgery they may, by means of a pivoting mechanism (not shown), be pivoted out of the beam path 12a from between object 40 and main objective 2 or out of the optical axis 11a of the main objective 2, respectively. By means of this ability to be pivoted, it is ensured that microscope 100 can also be applied for other surgical interventions, which do not require such supplementary optical systems.

With respect to the operation of the supplementary optical system, it shall be noted that the opthalmoscopical lens 30 creates a first intermediate image 31 of the object 40 before the main objective lens 2 of the microscope 100. The image 31 created by opthalmoscopical lens 30 is vertically and laterally reversed (pseudo-stereoscopic). It is advisable that the correcting lens 32 is provided in such a way that it may be displaced along the optical axis 11a, as is indicated by the double-sided arrow. By means of displacing the correcting lens 32, it is possible, for example, to focus onto a section of interest of the object or eye 40, without having to carry out adjustments to the optical system inside housing 102.

As explained, the intermediate image 31 is laterally and vertically reversed, i.e. pseudo-stereoscopic. In order to provide a vertically and laterally correct image, the deflector elements 21a, 21b are designed as concave mirrors (mirrors with a radius other than ∞). In particular, the following propagation of the viewing beam results: by means of the correcting or auxiliary lens 32, or, if applicable (subsequent to deflecting by deflecting element 5) of the supplementary optical components 8, the beam paths, which result from the vertical and laterally reversed intermediate image 31 are converted into a beam path, which is substantially parallel to the axis along the optical axis 11b of the first plane I of the microscope. This beam path parallel to the axis is by means of concave mirror 21a, deflected into a further intermediate image 22 in the vertical beam path 12c between the two planes I, II of the microscope. This intermediate image 22 is laterally correct and vertically correct, i.e. stereoscopic. By means of the concave mirror 21b, this intermediate image 22 is imaged to infinity in the second plane II of the microscope again (the beam path being substantially parallel to the axis). The magnification system 7 is preferably designed as a four-channel zoom system along the third optical axis 11d, whereby, as already mentioned, the stereoscopic splitting for the main surgeon and the assistant is effected. The double functionality of the deflector elements 21a, 21b should once again be noted. On the one hand, they serve to deflect the beam paths and thereby to optimally exploit the space inside the microscope body 102, on the other hand, they serve to invert a pseudo-stereoscopic intermediate image, whereby the number of optical components is reduced, as compared to conventional solutions.

Therefore, the deflector elements 21a, 21b both serve to deflect the respective viewing beam paths inside the body of the microscope, as well as to create an image or image to infinity, respectively, whereby an image erection of an inverted, pseudo-stereoscopic intermediate image is provided in a simple and cost-effective manner.

Therefore, according to the invention, it is possible to replace conventionally used SDI-systems, which comprise relatively complex prism systems and plane mirror systems, by simple convex mirrors 21a, 21b. It is also possible to provide the double functionality provided by the concave mirrors 21a, 21b by means of deflector prisms provided with a focal power. Instead of deflector elements 21a or 21b, it might also be considered to provide deflector element 5 with a focal power. Thereby, the inverted intermediate image would be created in the first plane I of the microscope.

If microscope 100 is to be used without the opthalmoscopical attachment 30, 32, said attachment is removeable from the beam path 12a, especially it may be pivoted out. A respective repositioning mechanism, which may be designed to be manually driven or motor-driven, is not shown in detail. In this case, as shown in FIG. 2, the deflector elements 21a, 21b, which are designed as concave mirrors, are removed from the viewing beam path (for example by pivoting) and replaced by conventional, planar deflector mirrors 22a, 22b. Apart from this, the configuration of the microscope according to FIG. 2 corresponds to that according to FIG. 1, so that a repeated detailed description may be omitted. It should merely be noted that in exchanging the concave mirrors 21a, 21b by conventional deflector elements 22a, 22b, which are designed as planar mirrors, further possibilities to couple out beam paths are given, as they are referred to as a whole as 50 in FIG. 2. To this end, the deflector elements 22a, 22b may be designed semi-transparently, whereby it is advisable to provide a further deflector element 51.

It is advisable that the deflector elements 21a, 21b and 22a, 22b, respectively, are coupled to the opthalmoscopical attachment, so that in case the ophtalmoscopical attachment is removed from the beam path 12a, the deflector elements 21a, 21b are automatically or motor-driven exchanged by the deflector elements 22a, 22b and vice versa. Thereby, if elements 30 and 32 of the supplementary optical system are not used, it is possible to also remove the focally-powered inverter system elements 21a, 21b and replace them with conventional planar deflection elements 21a, 21b in a simple manner. An electromechanical coupling 60 is shown in FIG. 1 for accomplishing the joint removal or insertion of the inverter system and supplementary optical system into or out of the beam path of the microscope.

Finally, it should be noted that it is possible to mirror-in data at the positions of the deflector elements 6 or 51. At these positions, it is further advantageous to employ an optical beam divider, for example for a documenting device.

LIST OF REFERENCE SIGNS 2 main objective
3 illumination means
3a deflector element of the illumination device
4 fiber optic cable
5, 6 deflector elements
7 magnification system (zoom system)
8 supplementary optical components
9 deflector element (out-coupling means)
10 deflector element
11a, 11b, 11c, 11d optical axes
12 optical axis of fiber cable
12a-12h viewing beams
13 pivot axis of deflector element 10
16 deflector element
21a, 21b deflector elements (concave mirrors)
22a, 22b deflector elements (planar mirrors)
22 intermediate image
30 opthalmoscopical lens (fundus lens)
31 intermediate image
32 correcting lens
40 object
50 decoupled beam paths
51 deflector element
60 electromechanical coupling
100 stereoscopic microscope
102 microscope body (housing)
I, II, III planes of the microscope

What is claimed is:

1. In a stereoscopic microscope of a type comprising an optical inverter system that erects a pseudo-stereoscopic image by reversing the pair of viewing beams of the pseudo-stereoscopic image and also laterally reversing this image, the pair of viewing beams traveling along a viewing beam path, the improvement comprising:

the optical inverter system includes a deflector element that changes direction of the viewing beam path other than by refracting the viewing beam, wherein the deflector element has a focal power.

2. The improvement according to claim 1, wherein the inverter system includes two deflector elements each changing direction of the viewing beam path and having a focal power.

3. The improvement according to claim 2, wherein at least one of the two deflector elements is a concave mirror.

4. The improvement according to claim 1, further comprising a decoupling device arranged in the viewing beam path to couple out an assistant viewing beam path.

5. In a stereoscopic microscope of a type comprising an optical inverter system that erects a pseudo-stereoscopic image by reversing the pair of viewing beams of the pseudo-stereoscopic image and also laterally reversing this image, the pair of viewing beams traveling along a viewing beam path, the improvement comprising:

the optical inverter system includes a concave mirror that changes directions of the viewing beam path by reflection, wherein the concave mirror has a focal power.

6. A stereoscopic microscope comprising:

a main objective;

a viewing beam path passing through the main objective;

a supplementary optical system selectively insertable into the viewing beam path in front of the main objective, the supplementary optical system including an ophthalmoscopical lens and a correcting lens, the ophthalmoscopical lens forming a pseudo-stereoscopic image; and an optical inverter system for erecting the pseudo-stereoscopic image by reversing the pair of viewing beams of the pseudo-stereoscopic image and also laterally reversing this image, the pair of viewing beams traveling along the viewing beam path, wherein the optical inverter system includes a deflector element that changes direction of the viewing beam path other than by refracting the pair of viewing beams, and the deflector element has a focal power.

7. The stereoscopic microscope according to claim 6, wherein the optical inverter system includes two deflector elements each changing direction of the viewing beam path and having a focal power.

8. The stereoscopic microscope according to claim 7, wherein a first deflector element of the two deflector elements is positioned in a first plane of the stereoscopic microscope and a second deflector element of the two deflector elements is positioned in a second plane of the stereoscopic microscope parallel to the first plane, the first deflector element forms a stereoscopic image at a location between the first and second planes, and the second deflector element images the stereoscopic image to infinity in the second plane.

9. The stereoscopic microscope according to claim 8, wherein the first deflector element is a concave mirror and the second deflector element is a concave mirror.

10. The stereoscopic microscope according to claim 6, wherein the optical inverter system and the supplementary optical system are electromechanically coupled to one another for joint removal and insertion relative to the viewing beam path.

* * * * *